(12) United States Patent
Dietz et al.

(10) Patent No.: US 11,873,796 B2
(45) Date of Patent: Jan. 16, 2024

(54) PLANETARY GEARBOX, IN PARTICULAR MULTI-PLANETARY GEARBOX, FOR A WIND TURBINE

(71) Applicant: Flender GmbH, Bocholt (DE)

(72) Inventors: Katrin Dietz, Essen (DE); Pascal Hessling, Bocholt (DE); Tim Vossschmidt, Gelsenkirchen (DE)

(73) Assignee: FLENDER GMBH, Bocholt (DE)

( * ) Notice: Subject to any disclaimer, the term of this patent is extended or adjusted under 35 U.S.C. 154(b) by 0 days.

(21) Appl. No.: 17/771,059

(22) PCT Filed: Sep. 4, 2020

(86) PCT No.: PCT/EP2020/074842
§ 371 (c)(1),
(2) Date: Apr. 22, 2022

(87) PCT Pub. No.: WO2021/078433
PCT Pub. Date: Apr. 29, 2021

(65) Prior Publication Data
US 2022/0372955 A1 Nov. 24, 2022

(30) Foreign Application Priority Data
Oct. 24, 2019 (EP) .................................... 19205121

(51) Int. Cl.
*F16H 57/04* (2010.01)
*F03D 15/00* (2016.01)
(Continued)

(52) U.S. Cl.
CPC ............. *F03D 15/00* (2016.05); *F03D 80/70* (2016.05); *F16H 57/023* (2013.01);
(Continued)

(58) Field of Classification Search
CPC ........ F03D 15/00; F03D 80/70; F16H 57/023; F16H 57/082; F16H 57/0457;
(Continued)

(56) References Cited

U.S. PATENT DOCUMENTS 4,617,839 A * 10/1986 Matoba ..................... F16H 1/28
475/345
5,098,358 A * 3/1992 Igaku ................ F16H 57/02004
74/DIG. 10
(Continued)

FOREIGN PATENT DOCUMENTS

DE 102013205432 10/2014
DE 102014215020 2/2016
(Continued)

OTHER PUBLICATIONS

Machine translation of WO 2018059984 A1 (Year: 2018).*
(Continued)

*Primary Examiner* — Jacob S. Scott
*Assistant Examiner* — Farhana Pervin
(74) *Attorney, Agent, or Firm* — Henry M. Feiereisen LLC (57) ABSTRACT

A planetary gearbox for a wind power installation includes a planetary carrier having a first and second carrier cheeks, planetary gears mounted rotatably on the first and second carrier cheeks via bearing pins, respectively, an internal gear meshing with the planetary gears, with an assembly clearance being configured between a cheek external diameter of the first and second carrier cheeks and an internal diameter of the internal gear, and a planetary carrier spider configured to position the first and second carrier cheeks at a defined spacing with respect to one another. The planetary carrier spider has a radially outwardly pointing outer side which extends at a greater spaced-apart relation radially inward (Continued)

from a radially inner tip circle radius of an internal toothing system of the internal gear than the first and second carrier cheeks and which is arranged radially outside with respect to an internal diameter of the planetary gears.

19 Claims, 6 Drawing Sheets

(51) Int. Cl.
| | |
|---|---|
| *F03D 80/70* | (2016.01) |
| *F16H 57/023* | (2012.01) |
| *F16H 57/08* | (2006.01) |
| *F16H 57/02* | (2012.01) |
| *F16H 57/021* | (2012.01) |

(52) U.S. Cl.
CPC ....... *F16H 57/0457* (2013.01); *F16H 57/082* (2013.01); *F16H 57/021* (2013.01); *F16H 57/04* (2013.01); *F16H 2057/02034* (2013.01); *F16H 2057/02078* (2013.01)

(58) Field of Classification Search
CPC .................. F16H 57/04; F16H 57/021; F16H 2057/02034; F16H 2057/02078
See application file for complete search history.

(56) References Cited

U.S. PATENT DOCUMENTS

| | | | | |
|---|---|---|---|---|
| 6,200,086 | B1* | 3/2001 | O'Shea | F16J 15/3404 |
| | | | | 415/230 |
| 2005/0026744 | A1* | 2/2005 | Illerhaus | F16H 57/082 |
| | | | | 475/331 |
| 2010/0304918 | A1* | 12/2010 | Burgman | F16H 57/082 |
| | | | | 475/331 |
| 2011/0132675 | A1* | 6/2011 | Braun | B60K 6/48 |
| | | | | 180/65.23 |
| 2012/0053009 | A1* | 3/2012 | Minadeo | F16H 57/082 |
| | | | | 475/346 |
| 2014/0171255 | A1 | 6/2014 | Fox et al. | |
| 2014/0206496 | A1* | 7/2014 | McCune | F02C 7/32 |
| | | | | 475/331 |
| 2017/0122296 | A1* | 5/2017 | Li | B23P 6/002 |
| 2019/0063410 | A1* | 2/2019 | Zhao | F16H 57/043 |
| 2019/0285142 | A1 | 9/2019 | Kirchgeßner et al. | |

FOREIGN PATENT DOCUMENTS

| | | |
|---|---|---|
| EP | 1 985 850 | 10/2008 |
| GB | 2232454 | 12/1990 |
| WO | WO 2015/088966 | 6/2015 |
| WO | WO 2018/059984 | 4/2018 |

OTHER PUBLICATIONS

International Search Report issued by the European Patent Office in International Application PCT/EP2020/074842 dated Oct. 30, 2020.

* cited by examiner

PLANETARY GEARBOX, IN PARTICULAR MULTI-PLANETARY GEARBOX, FOR A WIND TURBINE

CROSS-REFERENCES TO RELATED APPLICATIONS

This application is the U.S. National Stage of International Application No. PCT/EP2020/074842, filed Sep. 4, 2020, which designated the United States and has been published as International Publication No. WO 2021/078433 and which claims the priority of European Patent Application, Serial No. 19205121.7, filed Oct. 24, 2019, pursuant to 35 U.S.C. 119(a)-(d).

BACKGROUND OF THE INVENTION

The invention relates to a planetary gearbox, with the aid of which a torque and a rotational speed can be converted.

EP 1 985 850 A1 has disclosed a planetary gearbox for a wind power installation, in the case of which planetary gearbox two carrier cheeks, lying opposite one another, of a planetary carrier are connected to one another via axially running planetary carrier spiders. A radially outwardly pointing cylindrical shell face of the planetary carrier spider is of radially inwardly offset configuration with respect to a radially outer edge of the carrier cheeks, and merges in a sharp-edged manner into the carrier cheeks. The cylindrical shell face of the planetary carrier spider is arranged on a radius with respect to the rotational axis of the planetary carrier, on which an anti-friction bearing is also provided between a bearing pin, which is connected to the carrier cheeks, and a planetary gear which is mounted on the bearing pin. The anti-friction bearing is inserted into an internal diameter of the planetary gear.

There is a constant requirement to achieve a high performance density in a planetary gearbox with a small installation space requirement.

It is the object of the invention to specify measures which make a planetary gearbox with a high performance density and a small installation space requirement possible.

SUMMARY OF THE INVENTION

The object is achieved by way of a planetary gearbox as set forth hereinafter. Preferred refinements of the invention are specified in the subclaims and the following description, which preferred refinements can represent an aspect of the invention in each case individually or in combination.

According to the invention, a planetary gearbox, in particular a multiple planetary gearbox for a wind power installation, is provided with a planetary carrier which has a first carrier cheek and a second carrier cheek, planetary gears which are mounted rotatably via in each case one bearing pin on the first carrier cheek and the second carrier cheek, an internal gear which meshes with the planetary gears, an assembly clearance being configured between a cheek external diameter of the first carrier cheek and the second carrier cheek firstly and an internal diameter of the internal gear secondly, and at least one planetary carrier spider which positions the first carrier cheek and the second carrier cheek at a defined spacing with respect to one another, a radially outwardly pointing outer side of the planetary carrier spider being spaced apart radially inward to a more pronounced extent from a radially inner tip circle radius of an internal toothing system of the internal gear than the first carrier cheek and the second carrier cheek, and being arranged radially on the outside with respect to an internal diameter of the planetary gears.

In order to increase the performance density in a drive train of a wind power installation and to obtain a satisfactory degree of efficiency in the case of the power to be transmitted, it is possible for a plurality of multiple planetary gearboxes to be connected in series. In comparison with a conventional planetary gearbox with three planetary gears, the multiple planetary gearbox has four, five or more planetary gears and can have a comparatively low static transmission ratio. For example, a static transmission ratio $i_0$ of $1.0<|i_0|\leq 3.0$, in particular $1.1\leq|i_0|\leq 2.5$, preferably $1.2\leq|i_0|\leq 2.0$ and particularly preferably $1.3\leq|i_0|\leq 1.5$ is configured for the planetary gearbox which is configured, in particular, as a multiple planetary gearbox. In the case of a small transmission ratio of this type, a particularly high degree of efficiency and therefore a high performance density are achieved. This results, however, in high requirements of the geometry and the installation space of the planetary gearbox. In the case of a low static transmission ratio of this type, the planetary gears have a small diameter in comparison with a sun gear which meshes with the planetary gears, with the result that the radial spacing between the tip circle diameter of the external toothing system of the sun gear and the tip circle diameter of the internal toothing system of the internal gear is very tight. In addition, the planetary gears should be supported axially on the carrier cheeks, with the result that the carrier cheeks have to have a great cheek external diameter. Here, the cheek external diameter is to be selected to be so great that the carrier cheeks can only just be moved in the axial direction on the radial inside past the internal toothing system of the internal gear during assembly. As a result, a play which is rather small is configured between the cheek external diameter of the carrier cheeks and the tip circle diameter of the internal toothing system of the internal gear.

It has to be ensured during running operation of the planetary gearbox, however, that the planetary carrier does not come into contact with the internal toothing system, which cannot be guaranteed with sufficient safety in the case of a rather small play between the planetary carrier spider and the internal gear. Therefore, a spacing which goes beyond the assembly clearance between the carrier cheeks and the internal toothing system is provided between the outer side of the planetary carrier spider and the tip circle radius of the internal toothing system of the internal gear. Since the carrier cheeks are offset axially with respect to the internal toothing system of the internal gear, a very small radial spacing of the cheek external diameter from the internal diameter of the internal gear can be provided, whereas the outer side of the planetary carrier spider is offset radially inward somewhat with respect to the cheek external diameter of the carrier cheeks, in order to reliably avoid contact with the internal toothing system of the internal gear even with consideration of manufacturing and production tolerances and possible thermal expansion effects and/or centrifugal force effects.

In addition, a spacing a of the rotational axes of two planetary gears which follow one another in the circumferential direction with a tip circle diameter $d_a$ which corresponds to the external diameter of the planetary gear can be, in particular, merely $1.0\leq a/d_a\leq 2.0$, preferably $1.1\leq a/d_a\leq 1.5$, and particularly preferably $1.2\leq a/d_a\leq 1.3$. A roughly triangular intermeshing area, in which the planetary carrier spider can be configured, results between the planetary gears which follow one another in the circumferential direction and between the tip circle radius of the internal toothing system and the narrowest point between the planetary gears which follow one another. Here, the planetary carrier spider is positioned as close as possible to the internal gear, without coming into contact with the internal toothing system of the internal gear. Here, the radially outwardly pointing outer side of the planetary carrier spider can be provided in the common axial region with the internal toothing system of the internal gear slightly radially within the tip circle radius of the internal toothing system of the internal gear, the outer side of the planetary carrier spider running, at least in a part of the circumferential angle region which is assumed by the outer side, at a substantially constant spacing from the tip circle radius of the internal toothing system of the internal gear. Here, the outer side of the planetary carrier spider is provided at least radially outside an internal diameter of the adjacent planetary gear, via which the planetary gear is mounted on a bearing pin which is connected to the carrier cheeks. A point, at which the internal diameter of the planetary gear is situated radially to the outside at a maximum distance in relation to the rotational axis of the planetary gear, that is to say the rotational axis of the sun gear, the internal gear and the planetary carrier, defines a radius with respect to the rotational axis of the planetary gearbox, outside which the outer side of the planetary carrier spider is provided.

As a result, the planetary carrier spider can be arranged in an installation space between the sun gear and the internal gear, where sufficient installation space for a sufficiently large cross section for the planetary carrier spider can be configured between the planetary gears which follow one another in the circumferential direction, in order to support the carrier cheeks on one another in a reliable and stable manner and/or to connect them to one another. At the same time, the cross section of the planetary carrier spider can be positioned far enough away from the external toothing system of the planetary gears and the internal toothing system of the internal gear, in order to reliably avoid contact and not to impair sufficient lubrication. Instead, the outer side of the planetary carrier spider can even retain lubricant which drips off from the internal toothing system of the internal gear and/or can discharge it in the circumferential direction toward the planetary gears, with the result that the lubrication of the planetary gearbox is even improved with a reduced lubricant requirement. To this end, in particular, the outer side of the planetary carrier spider can cover a part of the respective planetary gear as viewed in the radial direction, with the result that lubricant which detaches from the internal toothing system of the internal gear does not pass in the circumferential direction between the planetary gears, but rather is collected by the outer side of the planetary carrier spider and is discharged to the planetary gears. In addition, the intermeshing region, in which the planetary carrier spider is provided, permits a comparatively acute form of the planetary carrier spider at those ends of the outer side which point in the tangential direction and a releasing of lubricant drops from the planetary carrier spider, in particular without the lubricant droplets being guided away from the adjacent planetary gear by way of adhesion effects on a lower side which points away from the outer side of the planetary carrier spider. The improved lubrication which is achieved as a result can further improve the degree of efficiency and the performance density of the planetary gearbox. As a result of the arrangement of the planetary gear spider in an intermeshing region just below the internal gear, a stable support of the carrier cheeks and improved lubrication can be achieved in the case of constricted installation space conditions, with the result that a planetary gearbox with a high performance density is made possible with a small installation space requirement.

The planetary gearbox can have a sun gear which meshes with the planetary gears and is arranged coaxially radially on the inside with respect to the internal gear. A torque flow which is transmitted by the planetary gearbox can in principle be introduced via the sun gear or the planetary carrier or the internal gear, and can be output via the sun gear or the planetary carrier or the internal gear if this component has not already been provided for the introduction of the torque. It is possible here that the sun gear, the planetary carrier and the internal gear are mounted rotatably; as an alternative, one component of the sun gear, the planetary carrier or the internal gear is braked permanently or temporarily and/or is coupled fixedly for conjoint rotation and/or is held fixedly such that it cannot move. For example, the internal gear can be part of a stationary gearbox housing. The bearing pin can be connected to the first carrier cheek and to the second carrier cheek and, in particular, can be clamped in the axial direction between the first carrier cheek and the second carrier cheek. The bearing pin is preferably fastened non-movably to the carrier cheeks, and the respective planetary gear is mounted on the bearing pin such that it can be rotated relative to it. The planetary gearbox can be arranged in a gearbox housing which protects the planetary gearbox against environmental influences and/or contaminations. Here, the gearbox housing can be configured so as to be fixedly stationary in a non-movable manner or so as to coronate with the internal gear. For example, the gearbox housing has an oil sump for receiving a lubricant, in particular lubricating oil.

In particular, the radially outwardly pointing outer side of the planetary carrier spider is arranged, at least to a large extent of a circumference of the planetary gear, radially outside a root circle radius of an external toothing system of the planetary gear, a circumferential angle region $\Delta\alpha$ of the planetary gear on the root circle radius of the external toothing system running, in particular, radially on the inside with respect to a maximum radially outer region of the outer side of the planetary carrier spider which is configured in a common axial region with the internal toothing system of the internal gear of $270°\leq\Delta\alpha\leq360$, preferably $300°\leq\Delta\alpha\leq345°$ and particularly preferably $315°\leq\Delta\alpha\leq330°$.

In a common axial region, in which the internal toothing system of the internal gear covers the outer side as viewed in the radial direction, the outer side of the planetary carrier spider has a maximum radially outer point which defines a radius in relation to the rotational axis of the planetary gearbox, that is to say the rotational axis of the sun gear, the internal gear and the planetary carrier. This imaginary radius runs through the planetary gear in such a way that a large part of the planetary gear is arranged radially within this radius and merely a part of the external toothing system of the planetary gear reaches beyond this radius, in order to be able to mesh with the internal toothing system of the internal gear. Here, this radius can run completely outside the root circle radius of the external toothing system of the planetary gear, or can run radially within the root circle radius of the external toothing system of the planetary gear merely in a small part of the circumference of the planetary gear in the manner of an intersecting secant. As a result, the planetary carrier spider can reach particularly far to the radial outside, which results in a correspondingly improved stability and reinforcement of the planetary carrier, and the lubrication of the planetary gears by way of lubricant which drips from the internal gear can be improved further. At the same time, a play which is just sufficient can be provided between the planetary carrier spider and the internal toothing system of the internal gear.

The planetary carrier spider preferably has a first part spider, configured in one piece with the first carrier cheek, and a second part spider, configured in one piece with the second carrier cheek, the first part spider and the second part spider bearing against one another in the axial direction, in particular. As a result, the planetary carrier can be of substantially double-shell configuration, it being possible, in particular, for the first carrier cheek to be of substantially identical configuration to the first part spider firstly and for the second carrier cheek to be of substantially identical configuration to the second part spider secondly, as a result of which production costs can be reduced.

It is particularly preferably provided that the first part spider and/or the second part spider merge/merges, in a manner which is spaced apart axially from the internal gear, substantially on the cheek external diameter into the first carrier cheek and/or into the second carrier cheek, that outer side of the planetary carrier spider which is provided in a common axial region with the internal space merging, in particular, via a curved and/or radius-shaped transition region into the first carrier cheek and/or into the second carrier cheek. Here, the finding is utilized that an axial intermediate space is provided between the respective carrier cheek and the internal gear, through which intermediate space the planetary carrier spider can extend past the internal gear radially to the outside to such an extent that the outer side of the planetary carrier spider can arrive at the external diameter of the respective carrier cheek. A radial step between the external diameter of the carrier cheek and the outer side of the planetary carrier spider and a sharp-edged transition can be avoided as a result. As a result, stress concentrator effects can be avoided or at least reduced in the transition region between the part spiders and the respective associated carrier cheek, as a result of which the strength and rigidity of the planetary carrier are improved.

It is provided, in particular, that the first part spider and/or the second part spider merge/merges at an angle, forming a transition edge, into the first carrier cheek and/or into the second carrier cheek. By virtue of the fact that the part spider does not merge into the carrier cheek without a shoulder, for example via an asymptotical course, a radial offset between the external diameter of the carrier cheek and the region, provided radially within the internal toothing system of the internal gear, of the outer side of the planetary carrier spider can be achieved via a comparatively small axial intermediate space between the carrier cheek and the internal toothing system of the internal gear, with the result that the axial installation space requirement can be kept low.

It is provided in a further embodiment that the first carrier cheek and the second carrier cheek have, in a common circumferential region with the planetary carrier spider, a tapered diameter portion to the radius of the radially outwardly pointing outer side of the planetary carrier spider, the tapered diameter portion merging, in particular, via a curved and/or radius-shaped course and/or at an angle which configures a transition edge into the cheek outer diameter of the first carrier cheek and/or the second carrier cheek. Here, the finding is utilized that no planetary gear can be provided in the region of the planetary carrier spider, with the result that an extent of the carrier cheek which goes beyond the tip circle radius of the internal toothing system of the internal gear in order to configure an axial running region for a planetary gear is not required at all in this circumferential region. In order to avoid stress concentrator effects, the carrier cheek can have a correspondingly suitable external contour between the external diameter and the diameter of the tapered diameter portion.

The planetary carrier spider preferably extends radially inward at least as far as an internal diameter of the planetary gear, in particular at least as far as a rotational axis of the planetary gear. As a result, the cross-sectional area of the planetary carrier spider can be of correspondingly great dimensions, in order to reinforce the planetary carrier sufficiently even in the case of great torques to be transmitted. As a result, the intermeshing region radially within the internal gear can be occupied to a large extent by the planetary carrier spider.

A spacing a of 3.0 mm≤a≤8.0 mm, in particular 4.0 mm≤a≤7.0 mm, preferably 5.0 mm≤a≤6.5 mm and particularly preferably 5.5 mm≤a≤6.0 mm is particularly preferably configured in a common axial region with an internal toothing system of the internal gear between the internal toothing system of the internal gear and the radially outwardly pointing outer side of the planetary carrier spider. In the case of a spacing of this type, contact of the internal gear with the planetary carrier spider can be avoided reliably within the permitted manufacturing and assembly tolerances. At the same time, the spacing is great enough that a flow resistance between the components which rotate relative to one another is avoided or is at least negligibly small.

In particular, a gap with a largely constant gap width s between the planetary carrier spider and the respective adjacent planetary gear is configured between the planetary carrier spider and the respective adjacent planetary gear, the following applying in the case of an external diameter $d_a$ of the planetary gear. $0.01 \leq s/d_a \leq 0.5$, preferably $0.03 \leq s/d_a \leq 0.2$, and particularly preferably $0.05 \leq s/d_g \leq 0.1$. A lower side, pointing toward the planetary gears, of the planetary carrier spider can run substantially on a constant radius with respect to a rotational axis of the adjacent planetary gear in this region, with the result that the gap which is configured in between also has a constant gap width between the lower side and the tip circle radius of the external toothing system of the respective planetary gear. In the case of a gap spacing of this type, the intermeshing region radially within the internal gear between the planetary gears which follow one another can be occupied to a large extent by the planetary carrier spider.

At least three, in particular at least six, preferably at least seven and particularly preferably at least eight planetary gears are preferably provided, in each case one planetary carrier spider being provided, in particular, between each pair of planetary gears which follow one another in the circumferential direction. As a result of the configuration of the planetary carrier spider which saves installation space, it is possible for a multiple planetary gearbox to be configured with a correspondingly large number of planetary gears which are arranged tightly behind one another in the circumferential direction, without impairing the rigidity of the planetary carrier. As a result of the high number of planetary gears, the loading of the individual planetary gear can be reduced, as a result of which high torques can be transmitted with a high degree of efficiency and a high performance density.

The first carrier cheek and/or the second carrier cheek particularly preferably have/has a thrust washer for axial running of the planetary gear. The thrust washer is supported, in particular, over the full cross section of the planetary gear by the respective carrier cheek.

A plain bearing is configured, in particular, between the planetary gear and the bearing pin. The installation space requirement in the radial direction between the planetary gear and the bearing pin, which installation space would otherwise be required for an anti-friction bearing, can be reduced considerably as a result. For example, a considerably thinner plain bearing bush in comparison with an anti-friction bearing can be plugged on the respective bearing pin, on which plain bearing bush the planetary gear can slide in a relatively rotatable manner. This makes it possible for planetary gears with a correspondingly small diameter to be used and/or for the diameter of the bearing pin to be increased, as a result of which the planetary carrier can be reinforced further.

The outer side of the planetary carrier spider preferably runs, at least in a part of the circumferential angle region which is assumed by the outer side, at a substantially constant spacing from the tip circle radius of the internal toothing system of the internal gear. The outer side of the planetary carrier spider can run as close as possible to the internal toothing system on a substantially constant radius with respect to a rotational axis of the planetary gearbox. As a result, the installation space, which is configured in the intermeshing region between the internal gear and planetary gears which follow one another, in the circumferential direction and/or radially to the outside can be utilized as satisfactorily as possible, as a result of which the strength and stability of the planetary carrier spider is improved.

The planetary carrier is particularly preferably mounted in a gearbox housing, a lubricant for lubricating the internal gear and the planetary gears, in particular by way of immersion lubrication and/or splash lubrication, being received in the gearbox housing. The lubricant which is introduced into the gearbox housing can be used repeatedly for the lubrication of the planetary gearbox. Since the planetary carrier spiders assist the lubrication of the planetary gears, simple and inexpensive lubrication of the planetary gearbox is already sufficient.

Furthermore, the invention relates to a drive train for a wind power installation with a rotor shaft which can be connected to a rotor which is driven by wind power, a motor shaft of an electric machine which can be operated in generator mode, and a gearbox which connects the rotor shaft to the motor shaft in a torque-transmitting manner for converting a torque and a rotational speed, the gearbox having at least one planetary gearbox which can be configured and developed as described in the preceding text, the gearbox having, in particular, at least two or at least three planetary gearboxes which are connected in series and can be configured and developed as described in the preceding text. As a result of the arrangement of the planetary carrier spider in an intermeshing region just below the internal gear, stable support of the carrier cheeks and improved lubrication of the planetary gearbox can be achieved in the case of constricted installation space conditions, with the result that a drive train with a high performance density and a low installation space requirement is made possible.

Furthermore, the invention relates to a wind power installation for generating energy from wind power, with a stand-alone tower, a nacelle which is attached to an upper end of the stand-alone tower, a rotor which can be driven by wind power, an electric machine which can be operated in generator mode, and a drive train which is received by the nacelle and can be configured and developed as described in the preceding text, for coupling the rotor in a torque-transmitting manner to the electric machine and converting a torque which is introduced by the rotor. As a result of the arrangement of the planetary carrier spider in an intermeshing region just below the internal gear, stable support of the carrier cheeks and improved lubrication of the planetary gearbox can be achieved in the case of constricted installation space conditions, with the result that a wind power installation with a high performance density and a low installation space requirement is made possible.

A further aspect of the invention relates to an industrial application. The industrial application can have a drive means which can be configured, for example, as an electric machine, an internal combustion engine, a hydraulic motor or a rotor which is driven by wind power. The drive means can be coupled to a gearbox for converting a torque and a rotational speed of the power output which is generated by the drive means. The gearbox of the industrial application which has at least one planetary gearbox which can be configured and developed as described in the preceding text can in turn be coupled in a torque-transmitting manner to a mechanical application, in which mechanical energy which is introduced by the gearbox can be utilized. The mechanical application is, for example, a mill, a vertical mill, a sugarcane mill, a cement mill, a rock crusher, a conveyor belt, a pump, a roller press, a slat conveyor, a tube mill, a rotary kiln, a slewing gear, a stirring unit, a lifting apparatus, a compactor, a car crusher, a commuter for recyclable materials, possibly previously separated and/or sorted waste materials or the like. As a result of the arrangement of the planetary carrier spider in an intermeshing region just below the internal gear, stable support of the carrier cheeks and improved lubrication of the planetary gearbox can be achieved in the case of constricted installation space conditions, with the result that an industrial application with a high performance density and a low installation space requirement is made possible.

BRIEF DESCRIPTION OF THE DRAWING

In the following text, the invention will be explained by way of example on the basis of preferred exemplary embodiments with reference to the appended drawings, it being possible for the features which are shown in the following to represent an aspect of the invention both in each case individually and in combination. In the drawings.

DETAILED DESCRIPTION OF PREFERRED EMBODIMENTS

Figure 1:
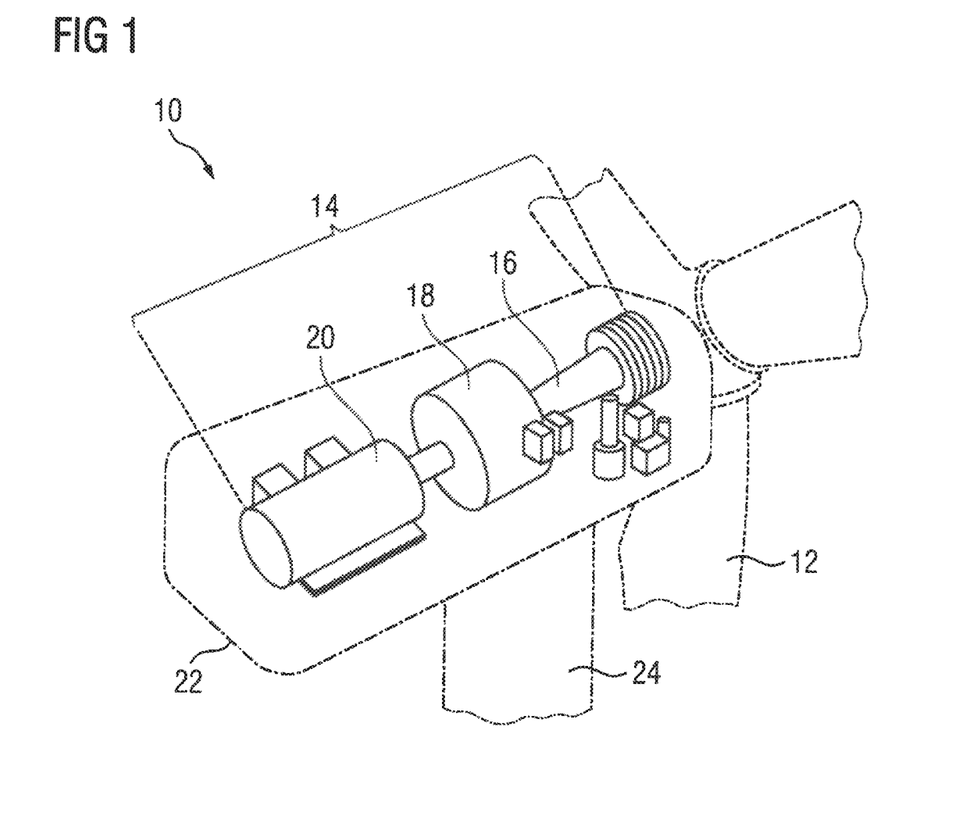
FIG. 1 shows a diagrammatic perspective view of a wind power installation.

The wind power installation 10 which is shown in FIG. 1 can be used for generating electric energy from wind power. To this end, the wind power installation 10 has a rotor 12 which can be set in rotation in a manner which is powered by wind. The rotor 12 is coupled to a drive train 14. To this end, the rotor 12 is connected to a rotor shaft 16 which is coupled within the drive train 14 to a gearbox 18, in order to convert the torque which is introduced via the rotor 12 and the rotor shaft 16. The torque which is converted in the gearbox 18 is fed to an electric machine 20 which is operated in generator mode. The electric energy which is generated by the electric machine 20 can be fed to a rechargeable battery and/or a power network. In the exemplary embodiment which is shown, the drive train 14 is accommodated completely in a nacelle 22 which is attached to an upper free end of a stand-alone tower 24.

Figure 2:
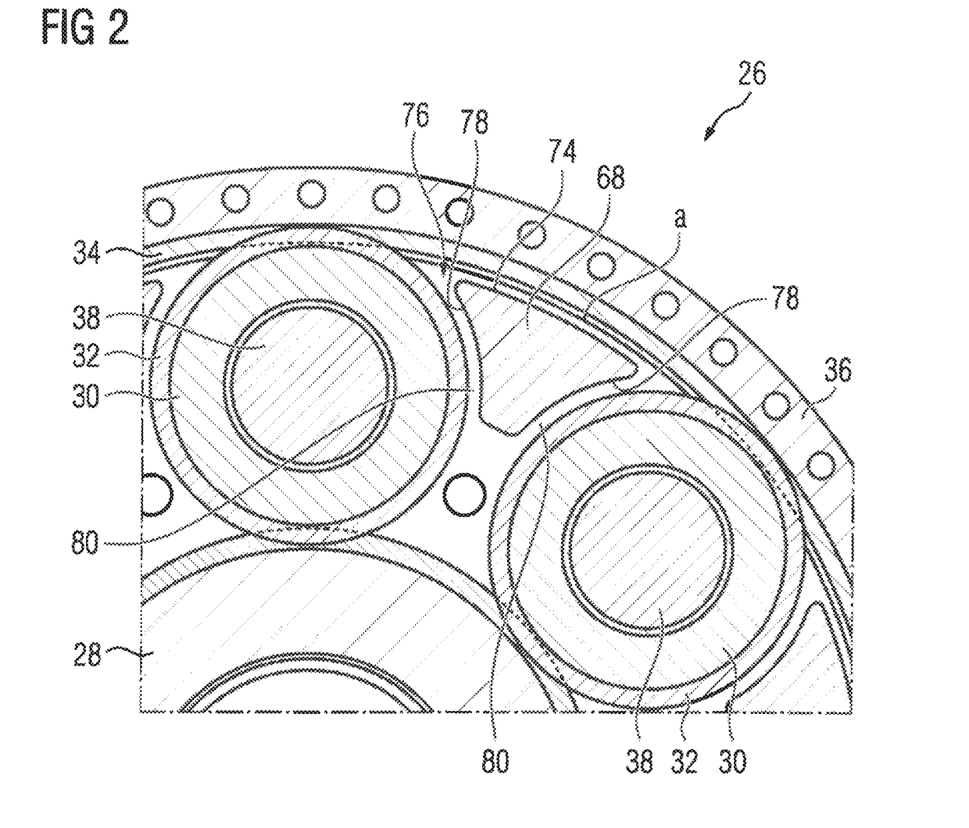
FIG. 2 shows a diagrammatic sectional plan view of a part of a planetary gearbox for the wind power installation from FIG. 1.
Figure 3:
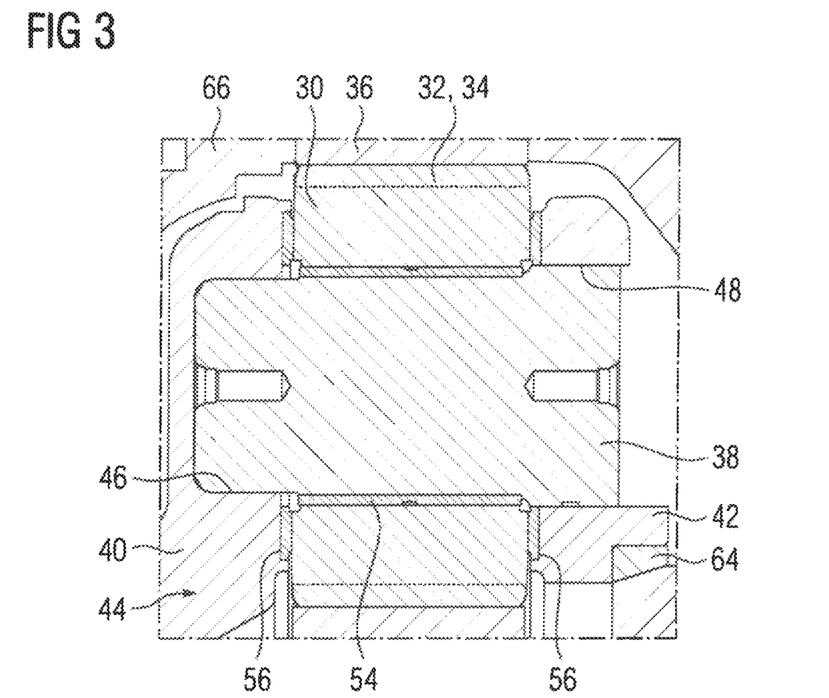
FIG. 3 shows a diagrammatic sectional view of the planetary gearbox from FIG. 2.

The gearbox 18 has at least one planetary gearbox 26 which is shown in greater detail in FIG. 2 and FIG. 3, the gearbox 18 having, in particular, a plurality of planetary gearboxes 26 which are connected in series. The planetary gearbox 26 has a sun gear 28 which can be rotated about a rotational axis of the planetary gearbox 26 and meshes with planetary gears 30. In particular, the planetary gearbox 26 is configured as a multiple planetary gearbox which has more than three planetary gears 30 which, in particular, are all arranged behind one another in the circumferential direction on a common radius in relation to the rotational axis of the planetary gearbox 26. The planetary gears 30 in turn mesh by way of their external toothing system 32 with an internal toothing system 34 of an internal gear 36 which is arranged coaxially with respect to the sun gear 28.

The respective planetary gear 30 is mounted rotatably on a bearing pin 38, the bearing pin 38 being fastened to a first carrier cheek 40 and a second carrier cheek 42 of a planetary carrier 44. In the exemplary embodiment which is shown, the bearing pin 38 is retained captively in a manner which is plugged partially via a through opening 48 of the second carrier cheek 42 into a receiving pocket 46 of the first carrier cheek 40.

A plain bearing sleeve 54 is plugged on the bearing pin 38, with the result that a plain bearing is configured between the planetary gear 30. As an alternative, instead of the plain bearing, an anti-friction bearing can be provided. On their axial sides which point toward the planetary gear 30, the first carrier cheek 40 and the second carrier cheek 42 in each case have a thrust washer 56, against which the planetary gear 30 can run axially during operation. The planetary carrier 44 can be mounted in a relatively rotatable manner on a gearbox housing 66 via an anti-friction bearing 64, the internal gear 36 being connected fixedly for conjoint rotation to the gearbox housing 66 via a radius region which is configured as a fastening flange in the exemplary embodiment which is shown. The gearbox housing 66 can be fixed such that it cannot move or can be mounted rotatably.

Figure 4:
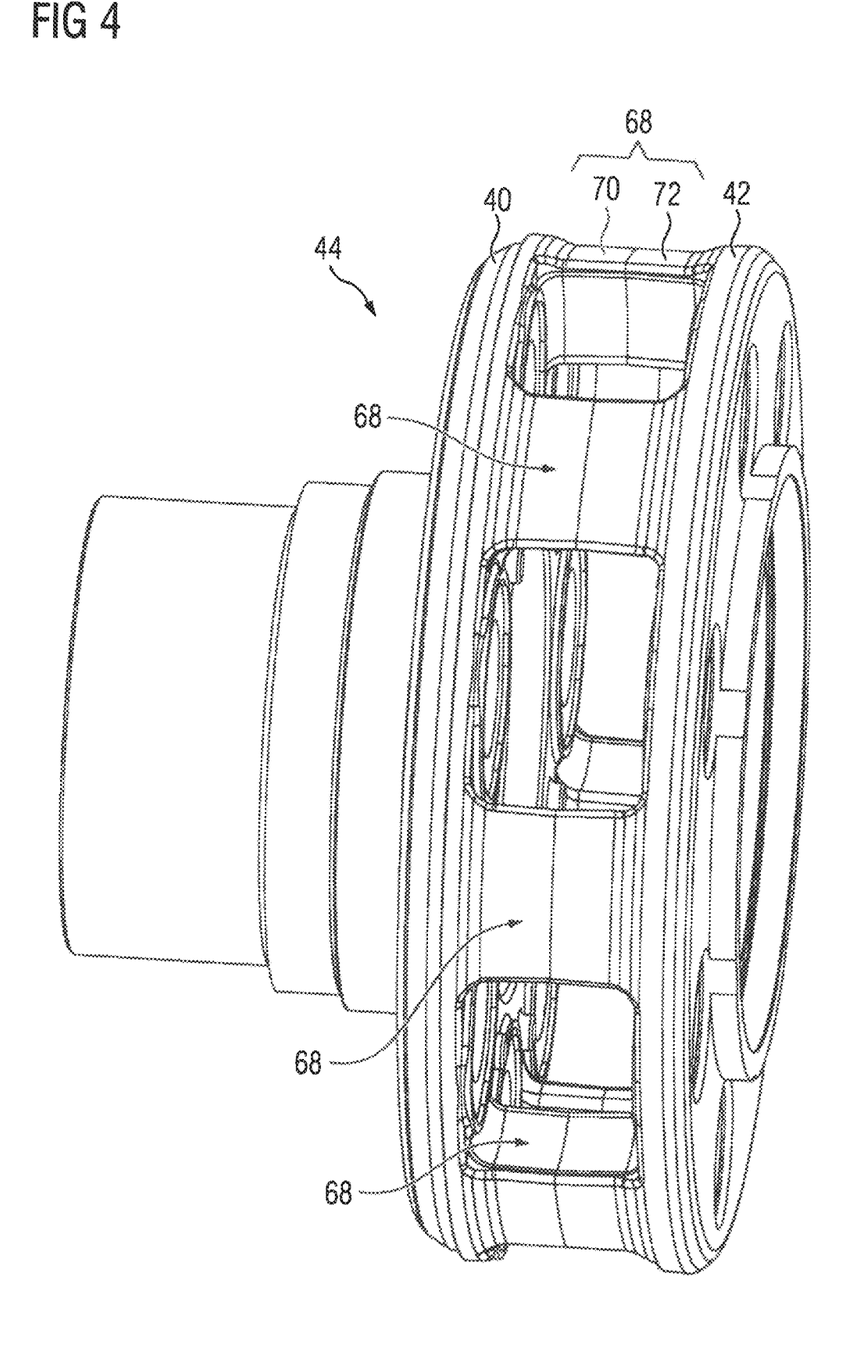
FIG. 4 shows a diagrammatic perspective view of a planetary carrier of the planetary gearbox from FIG. 2.
Figure 5:
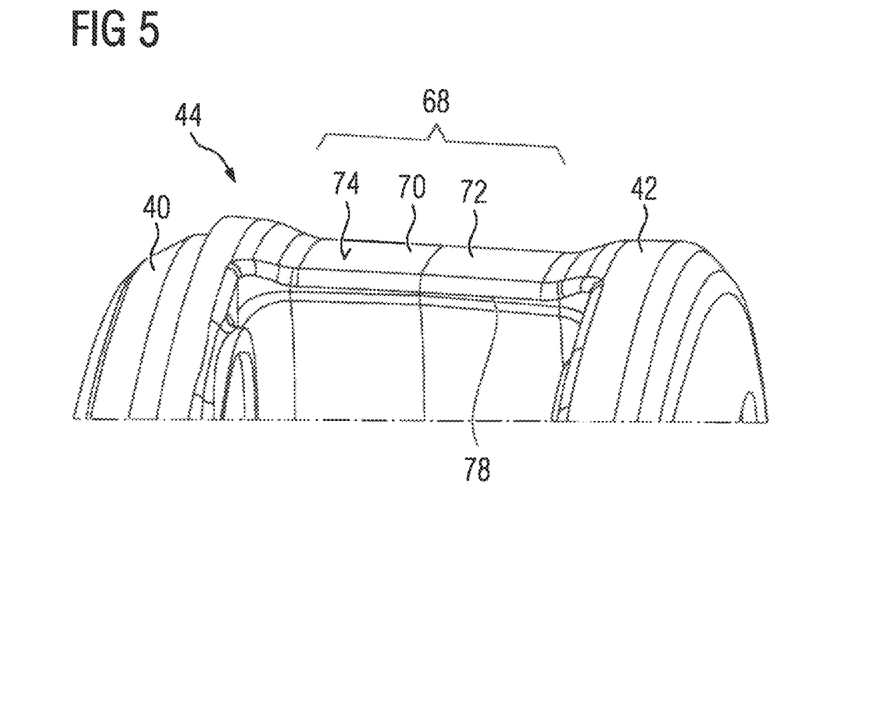
FIG. 5 shows a diagrammatic perspective detailed view of the planetary carrier from FIG. 4.

In the case of the planetary carrier 44 which is shown separately in FIG. 4 and FIG. 5, the first carrier cheek 40 and the second carrier cheek 42 are positioned at a defined spacing from one another via a planetary carrier spider 68. To this end, the planetary carrier spider 68 has a first part spider 70, which is configured in one piece with the first carrier cheek 40, and a second part spider 72, which is configured with the second carrier cheek 42, which part spiders 70, 72 bear against one another, for example, on their axial sides which point toward one another. The part spiders 70, 72 merge on the outer radius of the carrier cheeks 40, 42 into the respective carrier cheek 40, 42, the planetary carrier spider 68 running, however, in a somewhat radially inwardly curved manner, with the result that, in a common axial region with the internal toothing 34 of the internal gear 36, a particularly small spacing a is configured between an outer side 74 of the planetary carrier spider 68 and the internal toothing system 34. In particular, the planetary carrier spider 68 to a large extent fills an intermeshing region 76 which results between the planetary gears 30 which follow one another and the internal gear 36. In particular, an inner side 78 which points toward the respective planetary gear 30 can follow the external radius of the associated planetary gear 30, and can configure a gap 80 with a substantially constant gap width between the planetary gear spider 68 and the planetary gear 30.

Figure 6:
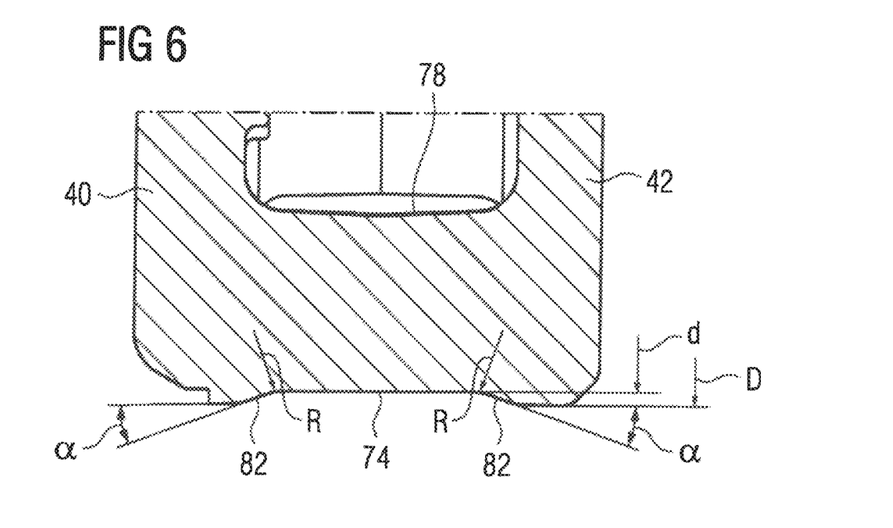
FIG. 6 shows a diagrammatic sectional view of the planetary carrier from FIG. 4.

As shown in FIG. 6, in its middle region in the axial direction which is positioned radially inside of the tip circle radius of the internal toothing system 34 of the internal gear 36, a diameter d of the outer side 74 of the planetary carrier spider 68 can be offset radially inward with respect to a cheek external diameter D of the carrier cheeks 40, 42 to such an extent that the outer sides 74 cannot come into contact with the internal gear 36 and are positioned radially outside an internal diameter of the planetary gear 30, in particular radially outside a root circle radius of the external toothing system 32 of the planetary gear 30. In addition, the outer side 74 merges via a radius R and at an angle α which configures a transition edge 82 on the cheek external diameter D into the respective carrier cheek 40, 42 without a significant stress concentrator action.

Figure 7:
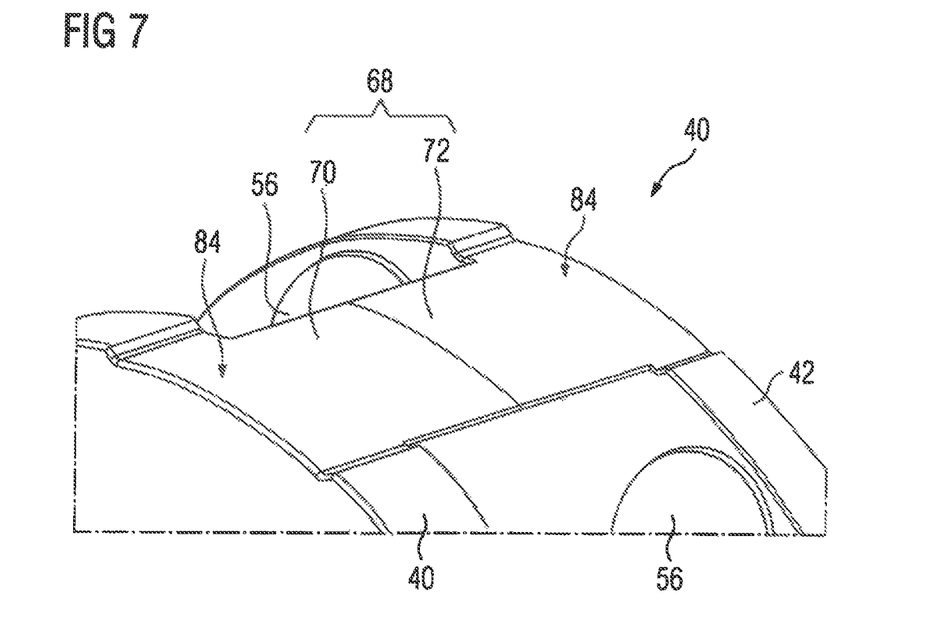
FIG. 7 shows a diagrammatic perspective detailed view of an alternative planetary carrier for the planetary gearbox from FIG. 2.

As shown in FIG. 7, as an alternative to that configuration of the planetary carrier 44 which is shown in FIG. 6, the carrier cheeks 40, 42 can have a tapered diameter portion 84 to the diameter d of the outer side 74 of the planetary carrier spider 68 in the circumferential region of the planetary carrier spider 68. In this case, the tapered diameter portion 84 can merge in the circumferential direction into the external diameter D of the carrier cheeks 40, 42, in an analogous manner with respect to the transition shown in FIG. 6 between the outer side 74 of the planetary carrier spider 68 and the carrier cheeks 40, 42.

Figure 8:
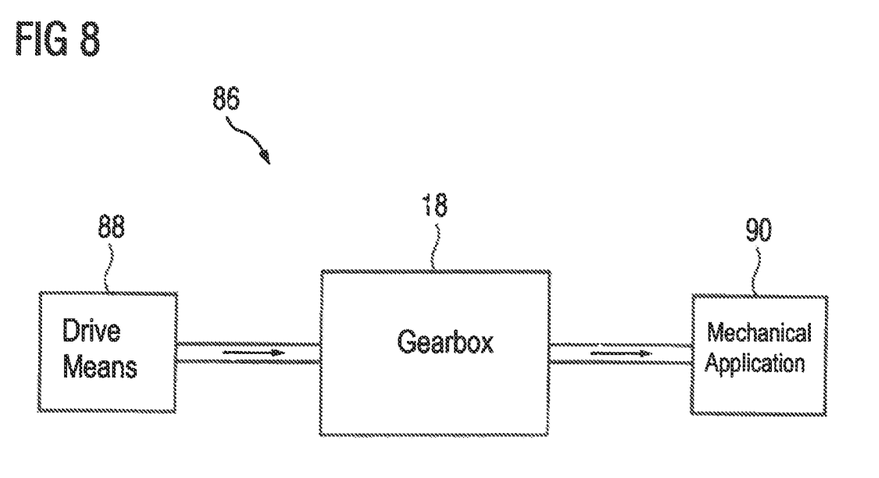
FIG. 8 shows a diagrammatic outline illustration of an industrial application.

The gearbox 18 which is explained using the example of a wind power installation 10 with the at least one planetary gearbox 26 can also be used in another industrial application 86, as shown in FIG. 8. The industrial application 86 has a drive means 88 which is configured, for example, as an electric machine, an internal combustion engine or a hydraulic motor. The drive means 88 is coupled in a torque-transmitting manner to the gearbox 18 which transmits the converted torque to a mechanical application 90. The drive means 88 is configured to output a drive power which is fed to the gearbox 18 via a first shaft 92 and is fed from the gearbox 18 via a second shaft 94 to the mechanical application 90. In particular, the rotational speed of the first shaft 92 is greater than the rotational speed of the second shaft 94. The mechanical application 90 is, for example, a mill, a vertical mill, a sugarcane mill, a cement mill, a rock crusher, a conveyor belt, a pump, a roller press, a slat conveyor, a tube mill, a rotary kiln, a slewing gear, a stirring unit, a lifting apparatus, a compactor, a car crusher, a commuter for recyclable materials, possibly previously separated and/or sorted waste materials or the like.

What is claimed is:

1. A planetary gearbox configured as a multiple planetary gearbox for a wind power installation, said planetary gearbox comprising:
    a planetary carrier including a first carrier cheek and a second carrier cheek;
    planetary gears mounted rotatably on the first carrier cheek and the second carrier cheek via bearing pins, respectively;
    an internal gear meshing with the planetary gears, with an assembly clearance being configured between a cheek external diameter of both the first carrier cheek and the second carrier cheek and an internal diameter of the internal gear; and a planetary carrier spider configured to position the first carrier cheek and the second carrier cheek at a defined spacing with respect to one another, said planetary carrier spider having a radially outwardly pointing outer side which extends at a greater spaced-apart relation radially inward from a radially inner tip circle radius of an internal toothing system of the internal gear than the first carrier cheek and the second carrier cheek, in order to reliably avoid contact with internal toothing system of the internal gear even with consideration of manufacturing and production tolerances and possible thermal expansion effects or centrifugal force effects, wherein the cheek external diameter is to be selected to be so great that the carrier cheeks can only just be moved in the axial direction on the radial inside past the internal toothing system of the internal gear during assembly; and wherein the radially outwardly pointing outer side of the planetary carrier spider is arranged radially outside a root circle radius of an external toothing system of the corresponding one of the planetary gears.

2. The planetary gearbox of claim 1, wherein a circumferential angle region of the corresponding one of the planetary gears on the root circle radius of the external toothing system runs radially inside with respect to a maximum radially outer region of the outer side of the planetary carrier spider in a range of $270° \leq \Delta\alpha \leq 360°$, preferably $300° \leq \Delta\alpha \leq 345°$ and particularly preferably $315° \leq \Delta\alpha \leq 330°$, wherein $\Delta\alpha$ is the circumferential angle region, with the planetary carrier spider configured in a common axial region with the internal toothing system of the internal gear.

3. The planetary gearbox of claim 1, wherein the planetary carrier spider includes a first part spider configured in one piece with the first carrier cheek, and a second part spider configured in one piece with the second carrier cheek.

4. The planetary gearbox of claim 3, wherein the first part spider and the second part spider bear against one another in an axial direction.

5. The planetary gearbox of claim 3, wherein at least one of the first part spider and the second part spider merges in an axial spaced-apart relation from the internal gear substantially on the cheek external diameter into at least one of the first carrier cheek and the second carrier cheek.

6. The planetary gearbox of claim 5, wherein the outer side of the planetary carrier spider is provided in a common axial region with an internal space and merges via a curved or radius-shaped transition region into the at least one of the first carrier cheek and the second carrier cheek.

7. The planetary gearbox of claim 1, wherein the first carrier cheek and the second carrier cheek have, in a common circumferential region with the planetary carrier spider, a tapered diameter portion to a radius of the radially outwardly pointing outer side of the planetary carrier spider.

8. The planetary gearbox of claim 7, wherein the tapered diameter portion merges via a curved and/or radius-shaped course or at an angle which configures a transition edge into a cheek outer diameter of at least one of the first carrier cheek and the second carrier cheek.

9. The planetary gearbox of claim 1, wherein the planetary carrier spider extends radially inward at least as far as an internal diameter of the planetary gears.

10. The planetary gearbox of claim 1, wherein the planetary carrier spider extends radially inward at least as far as a rotational axis of the planetary gear.

11. The planetary gearbox of claim 1, wherein a spacing a of 3.0 mm≤a≤8.0 mm, in particular 4.0 mm≤a≤7.0 mm, preferably 5.0 mm≤a≤6.5 mm and particularly preferably 5.5 mm≤a≤6.0 mm is configured in a common axial region with the internal toothing system of the internal gear between the internal toothing system of the internal gear and the radially outwardly pointing outer side of the planetary carrier spider.

12. The planetary gearbox of claim 1, wherein a gap with a largely constant gap width between the planetary carrier spider and an adjacent one of the planetary gears is configured between the planetary carrier spider and the adjacent one of the planetary gears, with the proviso that $0.01 \leq s/d_a \leq 0.5$, preferably $0.03 \leq s/d_a \leq 0.2$, and particularly preferably $0.05 \leq s/d_a \leq 0.1$, wherein s is the gap width and $d_a$ is an external diameter of the planetary gear.

13. The planetary gearbox of claim 1, wherein at least three planetary gears are provided, with one of said planetary carrier spider being provided between each pair of planetary gears which follow one another in a circumferential direction.

14. The planetary gearbox of claim 1, wherein at least one of the first carrier cheek and the second carrier cheek includes a thrust washer for axial running of the planetary gear.

15. The planetary gearbox of claim 1, further comprising a plain bearing arranged between the planetary gear and a corresponding one of the bearing pins.

16. The planetary gearbox of claim 1, wherein the outer side of the planetary carrier spider runs, at least in a part of a circumferential angle region which is assumed by the outer side, at a substantially constant spacing from the tip circle radius of the internal toothing system of the internal gear.

17. The planetary gearbox of claim 1, further comprising:
a gearbox housing in which the planetary carrier is mounted; and
a lubricant received in the gearbox housing for lubricating the internal gear and the planetary gears, in particular by way of immersion lubrication or splash lubrication.

18. A drive train for a wind power installation, said drive train comprising:
a rotor shaft connectable to a rotor driven by wind power;
a motor shaft of an electric machine operable in generator mode; and
a gearbox connecting the rotor shaft to the motor shaft in a torque-transmitting manner for converting a torque and a rotational speed, said gearbox including at least two or at least three planetary gearboxes which are connected in series, each of the planetary gearboxes being configured as set forth in claim 1.

19. A wind power installation for generating energy from wind power, said wind power installation comprising:
a stand-alone tower;
a nacelle attached to an upper end of the stand-alone tower;
a rotor driven by wind power;
an electric machine operable in generator mode; and
a drive train as set forth in claim 18, said drive train being received by the nacelle for coupling the rotor in a torque-transmitting manner to the electric machine and converting a torque which is introduced by the rotor.

* * * * *